United States Patent
Uneta et al.

(10) Patent No.: US 6,913,101 B2
(45) Date of Patent: Jul. 5, 2005

(54) STRUCTURE OF MOUNTING REAR FORK IN VEHICLE SUCH AS MOTORCYCLE

(75) Inventors: Hisashi Uneta, Saitama (JP); Taichi Honda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/665,433

(22) Filed: Sep. 22, 2003

(65) Prior Publication Data

US 2004/0130123 A1 Jul. 8, 2004

(30) Foreign Application Priority Data

Sep. 30, 2002 (JP) ........................................ 2002-288022

(51) Int. Cl.[7] .............................................. B62K 25/04
(52) U.S. Cl. ........................................ 180/227; 180/219
(58) Field of Search .............................. 180/219, 227, 180/228

(56) References Cited

U.S. PATENT DOCUMENTS 6,189,638 B1 * 2/2001 Ito et al. ..................... 180/227
6,253,868 B1 * 7/2001 Horii et al. .................. 180/227
6,450,282 B1 * 9/2002 Gogo et al. .................. 180/219
6,588,530 B2 * 7/2003 Keller et al. ................. 180/228

FOREIGN PATENT DOCUMENTS

JP           2000085673 A         3/2000

* cited by examiner

Primary Examiner—Lesley D. Morris
Assistant Examiner—L. Lum
(74) Attorney, Agent, or Firm—Birch, Stewart, Kolasch & Birch, LLP

(57) ABSTRACT

A structure for mounting a rear fork in a vehicle, including a body frame having left and right pivot supporting holes; left and right arm portions of a rear fork having supporting holes which are coaxial with the right and the left pivot supporting holes of the body frame a pivot shaft penetrating the pivot supporting holes of said body frame and the supporting holes of the left and right arm portions of the rear fork, said rear fork being rotatively supported on the pivot shaft and being rotatable with respect to said body frame. A tapered cutout is provided on the end surface portion of the collar to be pressed into the pivot supporting hole of the engine, so as to allow the pivot shaft to deflect.

15 Claims, 4 Drawing Sheets

STRUCTURE OF MOUNTING REAR FORK IN VEHICLE SUCH AS MOTORCYCLE

CROSS-REFERENCE TO RELATED APPLICATIONS

The present application claims priority under 35 USC 119 to Japanese Patent Application Nos. 2002-288022 filed on Sep. 30, 2002 the entire contents thereof are hereby incorporated by reference.

FIELD OF THE INVENTION

The present invention relates to structure of mounting a rear fork in a vehicle such as a motorcycle.

DESCRIPTION OF BACKGROUND ART

Conventionally, a structure for mounting a rear fork on a vehicle such as a motorcycle is known as disclosed for example, in Japanese Patent Laid-Open No. 2000-85673 in which between left and right pivot supporting holes of a body frame, pivot supporting holes of an engine supported by the body frame are arranged so as to become coaxial. In addition, between the pivot supporting holes of the body frame and pivot supporting holes of the engine, there are arranged supporting holes capable of being rotated with respect to left and right arm portions of the rear forks, respectively, so as to become coaxial with those pivot supporting holes; and so as to penetrate those pivot supporting holes of the body frame. The supporting holes are capable of being rotated relative to the rear fork and those pivot supporting holes of the engine, respectively. There is disposed a pivot shaft, whereby the rear fork is rotatively supported. See, Japanese Patent Laid-Open No. 2000-85673 (the $4^{th}$ page, FIG. 4).

The above-described conventional structure of mounting a rear fork in a vehicle such as a motorcycle has the following problems.

That is, an end surface portion of a pivot supporting hole of a vehicle frame or an engine for supporting a pivot shaft is confined to an extent that merely chamfering work is performed. When a load such as a road reaction force or a driving force is applied to the pivot shaft through the rear fork from the rear wheel, the pivot shaft is going to deflect in accordance with an amount of the load to be applied. At that time, the pivot shaft comes into line-contact with the end surface of the pivot supporting hole of the vehicle frame or the engine by which it is supported. Also, at this time, a strong shearing force is locally exerted on the pivot shaft As a result, the rotational characteristic of the rear fork does not draw any smooth curved line, resulting in a phenomenon in which driving information of the rear wheel becomes difficult to be smoothly conveyed to the driver.

SUMMARY AND OBJECTS OF THE INVENTION

The present invention has been achieved in view of the above-described state of affairs, and is aimed to provide a structure for mounting a rear fork in a vehicle such as a motorcycle, capable of accurately conveying driving information of the rear wheel to the driver when the rotation characteristic of the rear fork draws a smooth straight line or curved line. Thus, the driver can have excellent riding comfort.

In order to solve the above-described problem, a first aspect of the present invention provides a structure for mounting a rear fork in a vehicle such as a motorcycle including a body frame having left and right pivot supporting holes; left and right arm portions of a rear fork having supporting holes which are coaxial with the right and the left pivot supporting holes of the body frame; and a pivot shaft penetrating the pivot supporting holes of said body frame and the supporting holes of the left and right arm portions of the rear fork, said rear fork being rotatively supported on the pivot shaft and being rotatable with respect to said body frame. On an end surface portion of the pivot supporting hole of the body frame there is provided a cutout so as to allow the pivot shaft to deflect A second aspect of the present invention provides a structure for mounting a rear fork in a vehicle such as a motorcycle, including an engine supported by a body frame provided with pivot supporting holes; left and right arm portions of said rear fork having supporting holes which are coaxial with the right and the left pivot supporting holes of the engine; and a pivot shaft penetrating the supporting holes of the right and the left arm portions of the rear fork and the pivot supporting holes of the engine, said rear fork being rotatively supported by said pivot shaft and being rotatable with respect to the engine and the body frame. On an end surface portion of the pivot supporting holes of the engine there is provided a cutout so as to allow the pivot shaft to deflect.

A third aspect of the present invention provides a structure including a body frame having left and right supporting holes; an engine supported by said body frame, the engine having pivot supporting holes arranged so as to become coaxial and between the pivot supporting holes of said body frame; and a pivot shaft for penetrating the left and right supporting holes of said body frame and the pivot supporting holes of the engine, said rear fork being rotatively supported by said pivot shaft and being rotatable with respect to said engine and said body frame. On an end surface portion of the pivot supporting holes of the body frame or the pivot supporting holes of the engine, there is provided a cutout respectively so as to allow the pivot shaft to deflect The present invention provides a structure for mounting a rear fork in a vehicle such as a motorcycle wherein the cutout is directly formed on a pivot supporting hole formed on the rear portion of a crankcase of the engine.

The present invention also provides a structure for mounting a rear fork in a vehicle such as a motorcycle wherein the cutout is formed on a collar to be pressed into a pivot supporting hole formed on the rear portion of the crankcase of the engine.

The present invention provides a structure for mounting a rear fork in a vehicle such as a motorcycle wherein the cutout is formed by cutting in a tapered configuration at a predetermined angle with respect to a longitudinal axis of the pivot supporting hole.

The structure for mounting a rear fork in a vehicle such as a motorcycle also provides the above-described predetermined angle that is set within a range of 1.5° to 4.0°.

According to the present invention, a load such as a road reaction force or a driving force is applied to the pivot shaft through the rear fork from the rear wheel and the pivot shaft is going to deflect. At that time, however, since there is provided a cutout on an end surface portion of the pivot supporting hole of the body frame or the pivot supporting hole of the engine, the pivot shaft freely deflects only by the amount corresponding to this cutout being provided. Also, at this time, the pivot shaft comes into contact with the neighborhood of the end surface portion of those pivot supporting holes at a broader area than when it comes into line-contact with the end surface of the pivot supporting hole of the conventional vehicle frame or engine. For this reason, no strong shearing force is locally exerted on the pivot shaft, but a rotation characteristic of the rear fork is to draw a smooth straight line or curved line and as a result, driving information of the rear wheel is smoothly conveyed to the driver.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, with reference to the drawings, the description will be made of embodiments for a motorcycle equipped with a structure for mounting a rear fork according to the present invention. In this respect, in the description, the directions such as "before and behind" and "left and right" shall be defined with the vehicle body as the reference.

Figure 1:
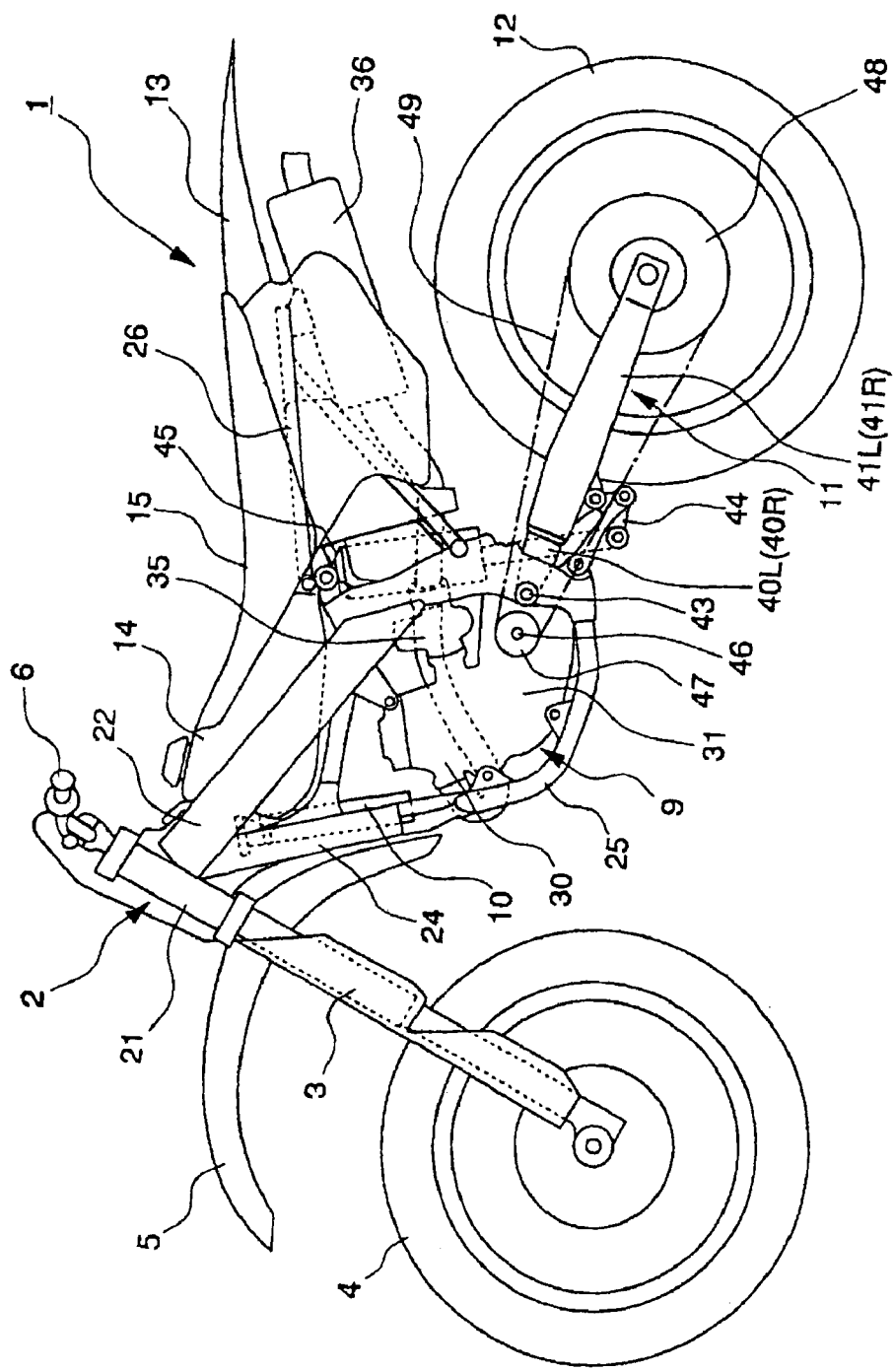
FIG. 1 is a side view showing an embodiment of the present invention, and a motorcycle equipped with a structure for mounting a rear fork according to the present invention.

FIG. 1 is a side view showing the general construction of a motorcycle equipped with a structure for mounting a rear fork according to the present invention.

The motorcycle 1 is for so-called off-road operation, and includes a body frame 2, a pair of left and right telescopic type front forks 3 pivotally supported by a front end of the body frame 2, a front wheel 4 rotatively supported by a lower end of the front fork 3, a front fender 5 supported by the front fork 3 for covering the upper part of the front wheel 4 and a steering wheel 6 mounted to an upper end of the front fork 3 and arranged above at the front portion of the vehicle body.

Also, the motorcycle 1 has an engine 9 supported by the body frame 2, a radiator 10 arranged above forward of the engine 9, a rear fork 11 extending along the left and right directions in the rear part of the vehicle body and supported by the body frame 2 rotatively around the pivot shaft a rear wheel 12 rotatively supported by the rear end of this rear fork 11 that is rotated by a driving force of the engine 9 and a rear fender 13 supported by the body frame 2 for covering the upper part of the rear wheel 12.

Also, the motorcycle 1 has a fuel tank 14, one portion of which is supported by the body frame 2 so as to protrude upwardly from the body frame 2 and a seat 15 arranged behind the fuel tank 14, on which the driver is seated.

The body frame 2 is provided with a head pipe 21 at the front end, main pipes 22 which branch off leftward and rightward from the upper part of this head pipe 21 for extending toward the rear, left and right center brackets 23 welded to the rear parts of the main pipes 22 for extending downwardly, a down pipe 24 extending downwardly from a coupled portion between the head pipe 21 and the main pipe 22 toward the rear, left and right low pipes 25 which branch off leftward and rightward from the lower end of the down pipe 24 for extending rearwardly to be coupled to the lower ends of the left and right center brackets 23, respectively; left and right rear pipes 26 for extending from the upper ends of the center brackets 23 rearwardly and left and right rear cross pipes which extend obliquely above rearwardly from the intermediate rear part of the center bracket 23 to be coupled to the intermediate part of the rear pipe 26.

Also, the left and right center brackets 23 are adequately coupled through cross members (illustration omitted) provided at required places, whereby the brackets 23 have great rigidity enough to be able to support the engine 9 and the rear fork 11.

The engine 9 has a cylinder block 30 equipped with a cylinder head portion and a cylinder portion, and a crankcase 31 contiguously provided under the cylinder block 30, and in the rear part of the engine 9, a transmission is contained in the crankcase 31. That is, the crankcase serves dually as a transmission case. The upper end of the cylinder block 30 is coupled to the main pipe 22 through a hanger, the front end of the cylinder block is coupled to the low pipe 25 through a hanger, the lower end of the crankcase 31 is coupled to the low pipe 25 through a hanger and further the rear part of the crankcase 31 is coupled to the center bracket 23 through a pivot shaft 43 to be described later whereby the engine 9 is supported by the body frame 2.

To the engine 9, an air-fuel mixture is supplied through a carburetor 35 arranged below the fuel tank 14. From the engine 9, combustion gas is discharged through an exhaust pipe 36 extending toward the rear along the lower portions of the seat 15 and the rear fender 13.

The rear fork 11 is an H-shaped member when viewed in plane, having a pair of left and right arm portions 40L, 40R at the front end portion, and a pair of left and right leg portions 41L, 41R at the rear end portion. The left and right arm portions 40L, 40R and intermediate portions of the leg portions 41L, 41R are coupled to each other. At the rear end of the left and right leg portions 41, the rear wheel 12 is rotatively supported. Also, at the front ends of the left and right arm portions 40L, 40R of the rear fork 11, there are formed supporting holes capable of being rotated 42L, 42R, respectively (See FIGS. 2 and 3). A pivot shaft 43 penetrates through each of the supporting holes capable of being rotated 42L, 42R, whereby the rear fork 11 is capable of pivoting in the vertical direction around the pivot shaft 43. Also, between the rear fork 11 and a cross member (illustration omitted) provided on the upper end of the center bracket 23, there is interposed a rear shock absorber 45 through a link mechanism 44, whereby vibration which the rear wheel 12 receives from the road surface is to be relaxed and absorbed.

In this respect, in FIG. 1, an output shaft 46 of a transmission 47, a driving sprocket mounted to the output shaft 46, a driven sprocket 48 mounted to a rear wheel axle and a chain 49 wound between the driving sprocket 47 and the driven sprocket 48 are provided.

Figure 2:
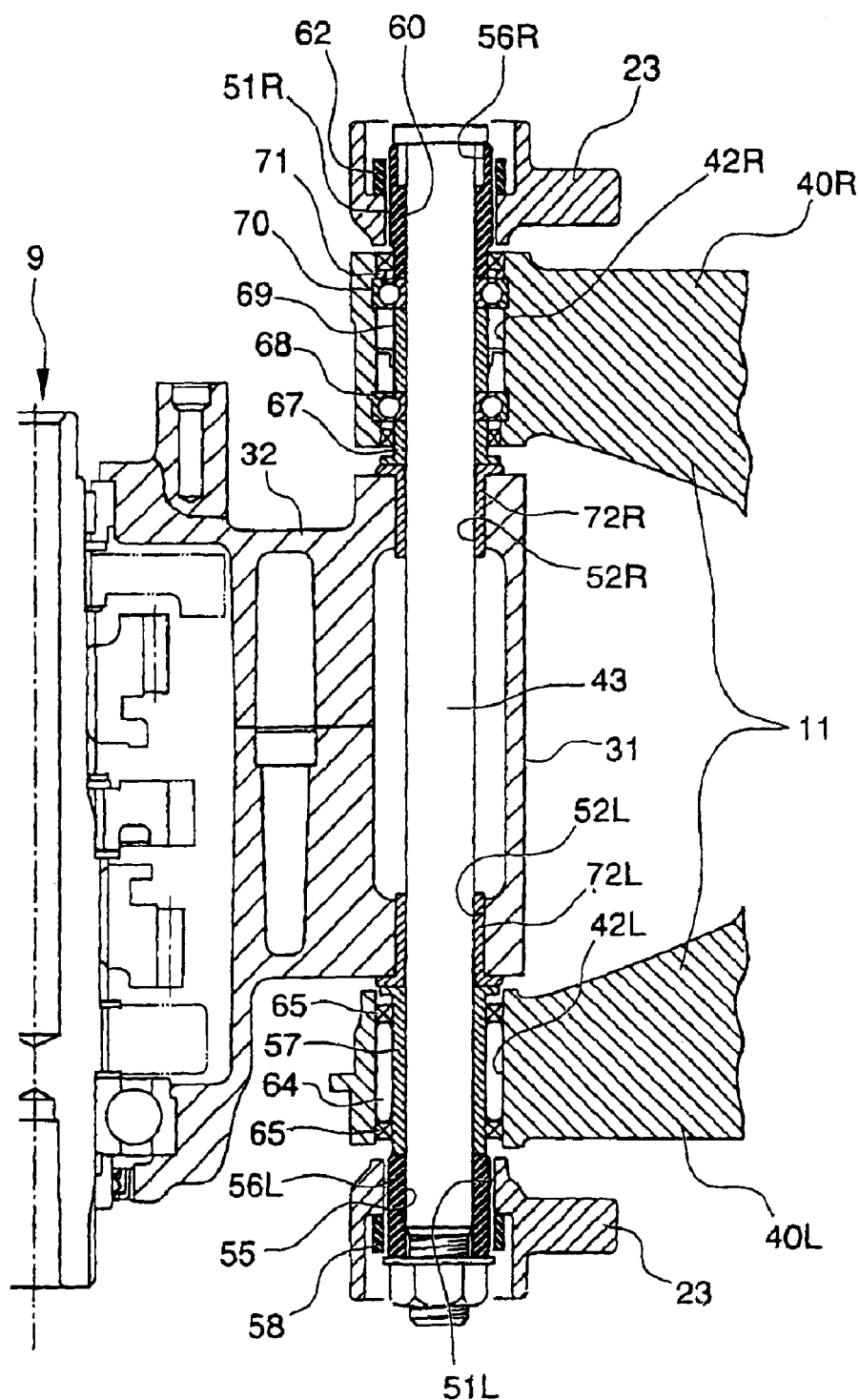
FIG. 2 is a cross-sectional view showing an embodiment of the present invention, and a principal part of a structure for mounting a rear fork of the same motorcycle.
Figure 3:
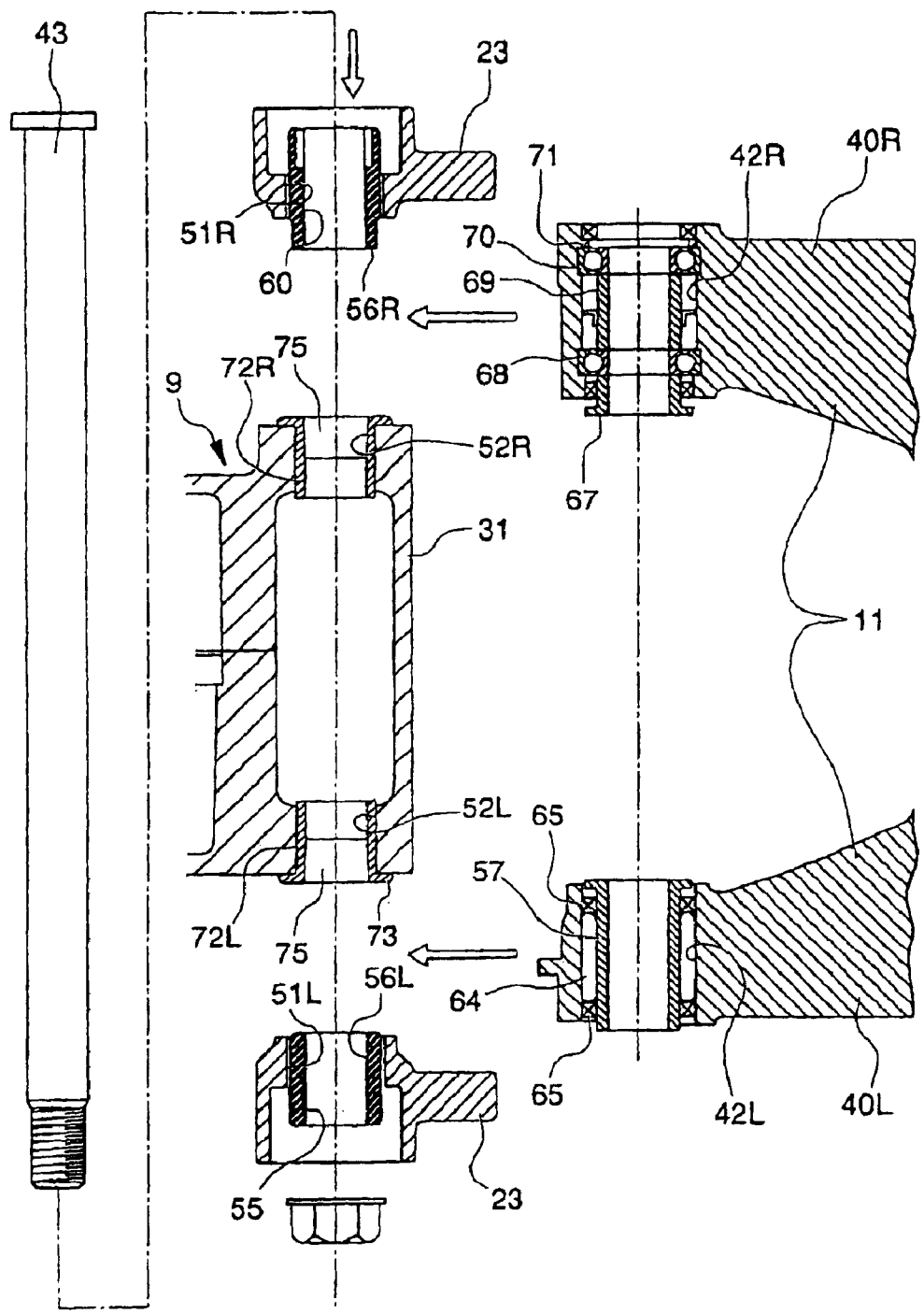
FIG. 3 is an exploded view showing an embodiment of the present invention, and a principal part of a structure for mounting a rear fork of the same motorcycle.

The structure of mounting the rear fork 11 will be specifically described. FIG. 2 is a cross-sectional view showing the relationship between the body frame 2, the engine 9 and the rear fork 11. FIG. 3 is an exploded cross-sectional view showing the vicinity of a rear fork mounted portion. On the left and right center brackets 23, 23 of the body frame 1, there are formed pivot supporting holes 51L, 51R, respectively, while on both left and right sides of a rear end portion of the crankcase 31 of the engine 9 to be arranged between the left and right center brackets 23, there are formed pivot supporting holes 52L, 52R, respectively. Thus, the engine 9 is supported by and fixed to the body frame 2 in such a manner that the pivot supporting holes 52L, 52R in the rear end portion of the crankcase become coaxial with the pivot supporting holes 51L, 51R of the center brackets 23, 23.

Also, at the front end portions of the left and right arm portions of the rear fork 1, there are formed supporting holes 42L, 42R as described above, respectively, and the supporting holes 42L, 42R are arranged between the pivot supporting holes 51L, 51R on the body frame 2 side and the pivot supporting holes 52L, 52R on the engine 9 side in such a manner that they become coaxial with the pivot supporting holes 51L, 51R, 52R, 52L.

In other words, between the pivot supporting holes 51L, 51R on the left and right center brackets 23, the pivot supporting holes 52L, 52R of the rear end portion of the crankcase 31 of the engine 9 are arranged so as to become coaxial with each other, and between the pivot supporting hole 51L of the center bracket 23 on the left side of those pivot supporting holes and the pivot supporting hole 52L of the engine 9 on the left side, a supporting hole 42L of the arm portion 40L of the rear fork 11 on the left side is arranged so as to become coaxial with the pivot supporting holes 51L, 52L while between the pivot supporting hole 51R of the center bracket 23 on the right side and the pivot supporting hole 52R of the engine 9 on the right side, a supporting hole 42R of the arm portion 40R of the rear fork 11 on the right side is arranged so as to become coaxial with the pivot supporting holes 51R, 52R.

Thus, so as to penetrate the pivot supporting holes 51L, 51R on the body frame 2 side, the supporting holes 42L, 42R on the rear fork 11 and the pivot supporting holes 52L, 52R on the engine side, respectively, the pivot shaft 43 is disposed, whereby the rear fork 11 is rotatively supported.

To the pivot supporting hole 51L on the center bracket 23 of the body frame 2 on the left side, an adjusting bolt 56L on the left side having a pivot shaft insertion hole 55 is screwed, and into the pivot shaft insertion hole 55, the pivot shaft 43 is inserted. This adjusting bolt 56L on the left side is screw-adjusted, whereby it is moved on a longitudinal axis of the pivot supporting hole 51L and its tip end (right end) is capable of being brought into and out of contact with the left end surface of a first collar 57. Namely, this adjusting bolt 56L on the left side adjusts a distance between the arm portion 40L of the rear fork 11 on the left side and the pivot supporting hole 51L of the body frame on the left side by being screw-adjusted. In this respect, to the outer periphery of the adjusting bolt 56L, a lock nut 58 is screwed (See FIG. 2).

To the pivot supporting hole 51R on the right side, there is screwed the adjusting bolt 56R on the right side having a pivot shaft insertion hole 60, and into the pivot shaft insertion hole 60, there is inserted a pivot shaft 43. This adjusting bolt 56R on the right side is screw-adjusted, whereby it is moved on a longitudinal axis of the pivot supporting hole 51R and its tip end (left end) is capable of being brought into and out of contact with the right end surface of an inner race in a third bearing 70. Namely, this adjusting bolt 56R on the right side adjusts a distance between the arm portion 40R of the rear fork 11 on the right side and the pivot supporting hole 51R of the body frame 2 on the right side by being screw-adjusted. In this respect, to the outer periphery of the adjusting bolt 56R, a lock nut 62 is screwed (See FIG. 2).

On the supporting hole 42L of the arm portion 40L of the rear fork 11 on the left side, the first collar 57 is rotatively supported through a first bearing 64, and on the first collar 57, the pivot shaft 43 is supported in an inserted-through state. The first bearing 64 is a bearing positioned in the direction of the longitudinal axis of which is not defined. For example, a needle bearing or the like is suitably utilized.

In this respect, dust seals 65 are provided to be arranged on both left and right ends of the first bearing 64.

The supporting hole 42R of the arm portion 40R of the rear fork 11 on the right side has a stepped inner periphery, and to this stepped supporting hole capable of being rotated 42R, there are mounted a second collar 67, a second bearing 68, a third collar 69 and a third bearing 70 in order from the vehicle body center side. These members are prevented from falling off by means of snap rings 71. The second/third collar 67, 69 and the second/third bearing 68, 61 are fitted to the pivot shaft 43, respectively. The second/third bearing 68, 70 is a bearing for defining a position on the right-side arm portion 40R in the direction of longitudinal axis (thrust direction) as a predetermined position, and for example, a ball bearing or the like is suitably utilized.

Into the left and right pivot supporting holes 52L, 52R to be formed at the rear end portion of the crankcase 31 of the engine 9, there are pressed the left and right collars 72L, 72R each having a flange on the outer side thereof respectively, and into the left and right collars 72L, 72R, there is inserted the pivot shaft 43.

Figure 4:
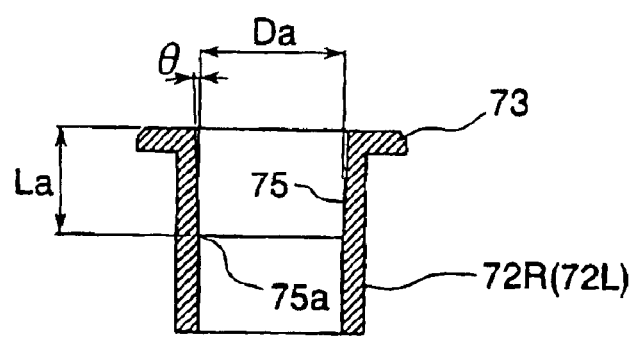
FIG. 4 is an enlarged cross-sectional view showing an embodiment of the present invention, and a collar in the structure for mounting a rear fork of the same motorcycle.

The left or right collar 72L, 72R, as also shown in FIG. 4, includes a cutout 75 on the outside end surface portion, which is its inner peripheral surface, and in which a flange 73 is to be formed, so as to allow the pivot shaft 43 to deflect.

The cutout 75 is formed by cutting in such a manner as to extend outwards in a tapered configuration at a predetermined angle $\theta$ with respect to the longitudinal axis of the collar 72L, 72R, in other words, in the longitudinal axis of the pivot supporting hole 52L, 52R. In this case, the predetermined angle $\theta$ is preferably set within a range of 1.50° to 4.00°. This is because in the case where the tapered angle is under 1.5°, when the pivot shaft 43 is going to deflect without any effect of providing the cutout 75 being obtained, a tendency to come into line-contact with the end surface of the collar 72L, 72R becomes stronger, and in the case where the tapered angle exceeds 4.00°, when the pivot shaft 43 is going to deflect conversely, there arises a possibility of coming into line-contact with an inner end portion 75a of the cutout.

Also, a ratio La/Da of length La of the cutout 75 to an inner diameter Da of the collar 72L, 72R is preferably 0.3 to 0.4. When this value is too large, deflection tolerance of the pivot shaft 43 becomes too large so that a constraint force to the rear wheel 12 is insufficient, and when this value is too small, the deflection tolerance of the pivot shaft 43 becomes insufficient so that the effect of providing the cutout 75 cannot be obtained.

Next, the description will be made of an operation of the structure of mounting a rear fork in a vehicle such as a motorcycle having the above-described structure.

During operation, the rear wheel 12 is moving relatively to the body frame 2 in an up-and-down direction or in a back-and-forth direction depending upon the road condition. When the brake is applied, at this time, a load such as a road reaction force is applied to the pivot shaft 43 through the rear fork 11 supporting the rear wheel 12. Then, the pivot shaft 43 is going to deflect due to this load, but at that time, since on the inner peripheral surface of the collar 72L, 72R with the flange which has been pressed into the pivot supporting hole 52L, 52R of the engine 2, specifically the pivot supporting hole 52L, 52R, there has been provided the cutout 75 having a tapered configuration, the pivot shaft 43 is to freely deflect only by the amount corresponding to the cutout 75.

Also, at this time, conventionally the pivot shaft 43 comes into contact in the neighborhood of the end surface portion in the outside of an inner peripheral surface of those collars 72L, 72R at a broader area than when it comes into line-contact with the end surface of the pivot supporting hole of the vehicle frame or the engine. For this reason, no strong shearing force is locally exerted on the pivot shaft 43, but a rotation characteristic of the rear fork 11 is to draw a smooth straight line or curved line, and as a result, driving information of the rear wheel 12 is smoothly conveyed to the driver.

In this respect, the above-described embodiment strictly exemplifies the present invention, and it is possible to appropriately change the design as needed without departing from the gist of the invention.

Figure 5:
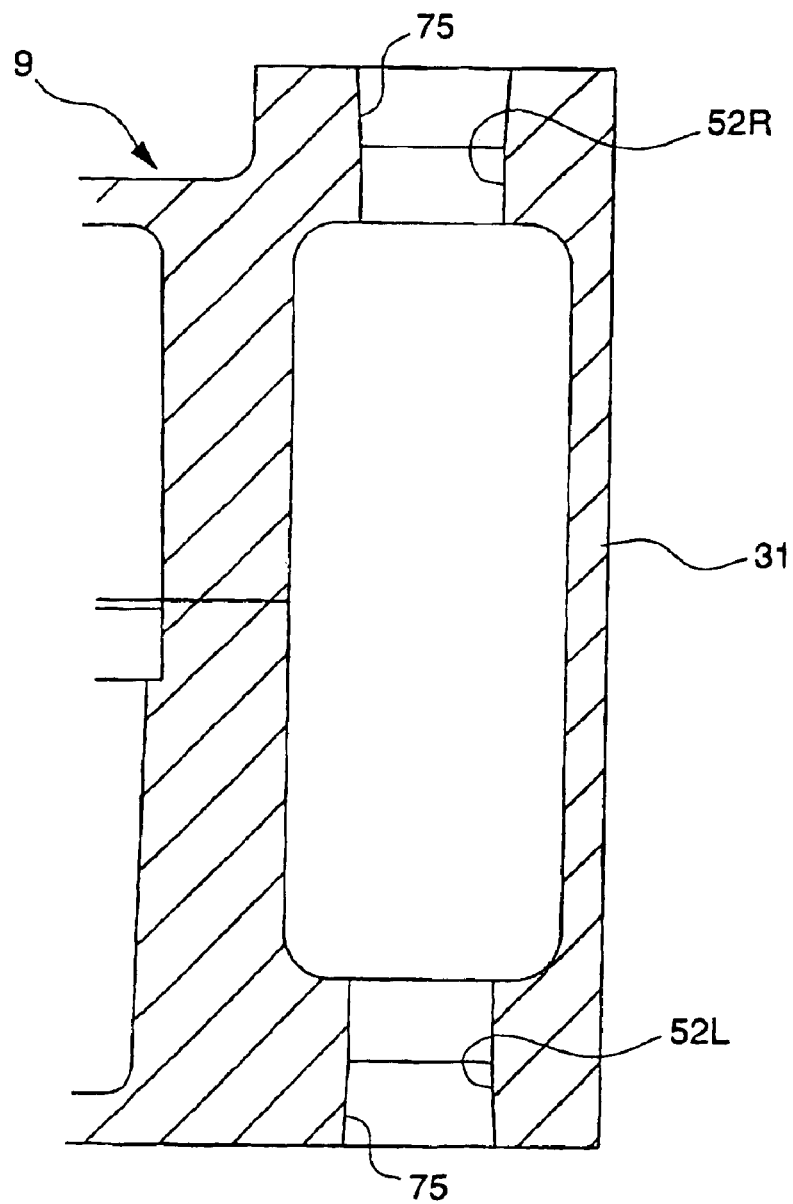
FIG. 5 is a cross-sectional view showing an embodiment of the present invention, and a principal part of another example of a motorcycle equipped with a structure for mounting a rear fork according to the present invention.

For example, in the above-described embodiment, the cutout 75 for allowing the pivot shaft 43 to deflect has been provided in the collar 72L, 72R to be pressed into the pivot supporting hole 52L, 52R. However, the present invention is not limited to this construction. The cutout 75 may be, as shown in, for example, FIG. 5, directly provided at the pivot supporting hole 52L, 52R to be formed at the rear end portion of the crankcase 31 of the engine 9.

In the above-described embodiment, the description has been made by exemplifying a type of construction wherein the body frame 2 and the engine 9 are provided with the pivot supporting hole 51L, 51R, 52L, 52R, respectively, and the pivot shaft 43 for supporting the rear fork is supported by means of these pivot supporting holes 51L. However, the present invention is not limited to this construction. Even in such a type of construction wherein the pivot shaft 43 is supported only by the pivot supporting hole provided on the body frame 2, or only by the pivot supporting hole provided in the engine 9, the end surface portion of each of the pivot supporting holes is provided with the cutout 75 for allowing the pivot shaft to deflect, whereby it is possible to apply the present invention.

For the cutout 75 to be formed at the pivot supporting hole or on the end surface portion of an inner peripheral surface of the collar, it is not limited to the tapered one shown in the above-described embodiment. For example, a circular arc surface-shaped one or one obtained by cutting like a stepped portion may be employed.

Also, the present invention is not limited to a motorcycle, but it goes without saying that it is applicable to other vehicles such as, for example, a three-wheeled vehicle having two front wheels and one rear wheel.

As described above in detail, the structure for supporting the rear fork in a vehicle such as a motorcycle according to the present invention exhibits the following excellent effects.

Since on the end surface portion of the pivot supporting hole of the body frame or the pivot supporting hole of the engine, there is provided a cutout so as to allow the pivot shaft to deflect, when a load such as a road reaction force or a driving force is applied to the pivot shaft through the rear fork from the rear wheel and the pivot shaft is going to deflect, the pivot shaft freely deflects only by the amount corresponding to this cutout being provided. At that time, the pivot shaft comes into contact with the neighborhood of the end surface portions of the pivot supporting holes at a broad area. For this reason, no strong shearing force is locally exerted on the pivot shaft, but a rotation characteristic of the rear fork is to draw a smooth straight line or curved line to improve the feeling of the side force and the feeling of the traction force.

Also, driving information of the rear wheel is to be smoothly conveyed to the driver, and the driver can have an excellent riding comfort Also, since no strong shearing force is locally exerted on the pivot shaft as described above, the pivot shaft is miniaturized for that amount, making it possible to reduce the weight.

Further, since the pivot shaft is allowed to deflect, the vehicle body characteristics that are flexible in a characteristic in the rolling direction can be obtained while the longitudinal rigidity is maintained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure for mounting a rear fork in a vehicle, comprising:
    a body frame having left and right pivot supporting holes;
    left and right arm portions of a rear fork having supporting holes, which are coaxial with the right and the left pivot supporting holes of the body frame;
    a pivot shaft penetrating the pivot supporting holes of said body frame and the supporting holes of the left and right arm portions of the rear fork, said rear fork being rotatively supported on the pivot shaft and being rotatable with respect to said body frame; and
    a cutout being provided on end surface portions of the pivot supporting holes of said body frame for allowing said pivot shaft to deflect.

2. A structure for mounting a rear fork in a vehicle, comprising:
    an engine supported by a body frame provided with pivot supporting holes;
    left and right arm portions of said rear fork having supporting holes, which are coaxial with the right and the left pivot supporting holes of the engine;
    a pivot shaft penetrating the supporting holes of the right and the left arm portions of the rear fork and the pivot supporting holes of the engine, said rear fork being rotatively supported by said pivot shaft and being rotatable with respect to the engine and the body frame; and a cutout disposed on end surface portions of the pivot supporting holes of said engine for allowing said pivot shaft to deflect.

3. A structure for mounting a rear fork in a vehicle comprising:

a body frame having left and right pivot supporting holes;

an engine supported by said body frame, the engine having pivot supporting holes arranged so as to become coaxial and between the pivot supporting holes of said body frame;

a pivot shaft for penetrating the left and right pivot supporting holes of said body frame and the pivot supporting holes of the engine, said rear fork being rotatively supported by said pivot shaft and being rotatable with respect to said engine and said body frame; and a cutout disposed on end surface portions of the pivot supporting holes of said body frame or the pivot supporting holes of said engine, respectively, for allowing said pivot shaft to deflect.

4. The structure for mounting a rear fork in a vehicle according to claim 3, wherein said cutout is directly formed on said pivot supporting hole of said engine formed on the rear portion of a crankcase of said engine.

5. The structure for mounting a rear fork in a vehicle according to claim 3, wherein said cutout is formed on a collar to be pressed into said pivot supporting hole of said engine formed on the rear portion of a crankcase of said engine.

6. The structure for mounting a rear fork in a vehicle according to claim 1, wherein said cutout is formed by cutting in a tapered configuration at a predetermined angle with respect to a longitudinal axis of said pivot supporting hole.

7. The structure for mounting a rear fork in a vehicle according to claim 2, wherein said cutout is formed by cutting in a tapered configuration at a predetermined angle with respect to a longitudinal axis of said pivot supporting hole.

8. The structure for mounting a rear fork in a vehicle according to claim 3, wherein said cutout is formed by cutting in a tapered configuration at a predetermined angle with respect to a longitudinal axis of said pivot supporting hole.

9. The structure for mounting a rear fork in a vehicle according to claim 4, wherein said cutout is formed by cutting in a tapered configuration at a predetermined angle with respect to a longitudinal axis of said pivot supporting hole of said engine.

10. The structure for mounting a rear fork in a vehicle according to claim 5, wherein said cutout is formed by cutting in a tapered configuration at a predetermined angle with respect to a longitudinal axis of said pivot supporting hole of said engine.

11. The structure of mounting a rear fork in a vehicle according to claim 6, wherein said predetermined angle is set within a range of $1.5°$ to $4.00°$.

12. The structure of mounting a rear fork in a vehicle according to claim 7, wherein said predetermined angle is set within a range of $1.5°$ to $4.0°$.

13. The structure of mounting a rear fork in a vehicle according to claim 8, wherein said predetermined angle is set within a range of $1.5°$ to $4.0°$.

14. The structure of mounting a rear fork in a vehicle according to claim 9, wherein said predetermined angle is set within a range of $1.5°$ to $4.0°$.

15. The structure of mounting a rear fork in a vehicle according to claim 10, wherein said predetermined angle is set within a range of $1.5°$ to $4.0°$.

* * * * *